J. G. LYDECKER.
ROTARY PERCH.
APPLICATION FILED AUG. 21, 1915.
1,180,595.
Patented Apr. 25, 1916.
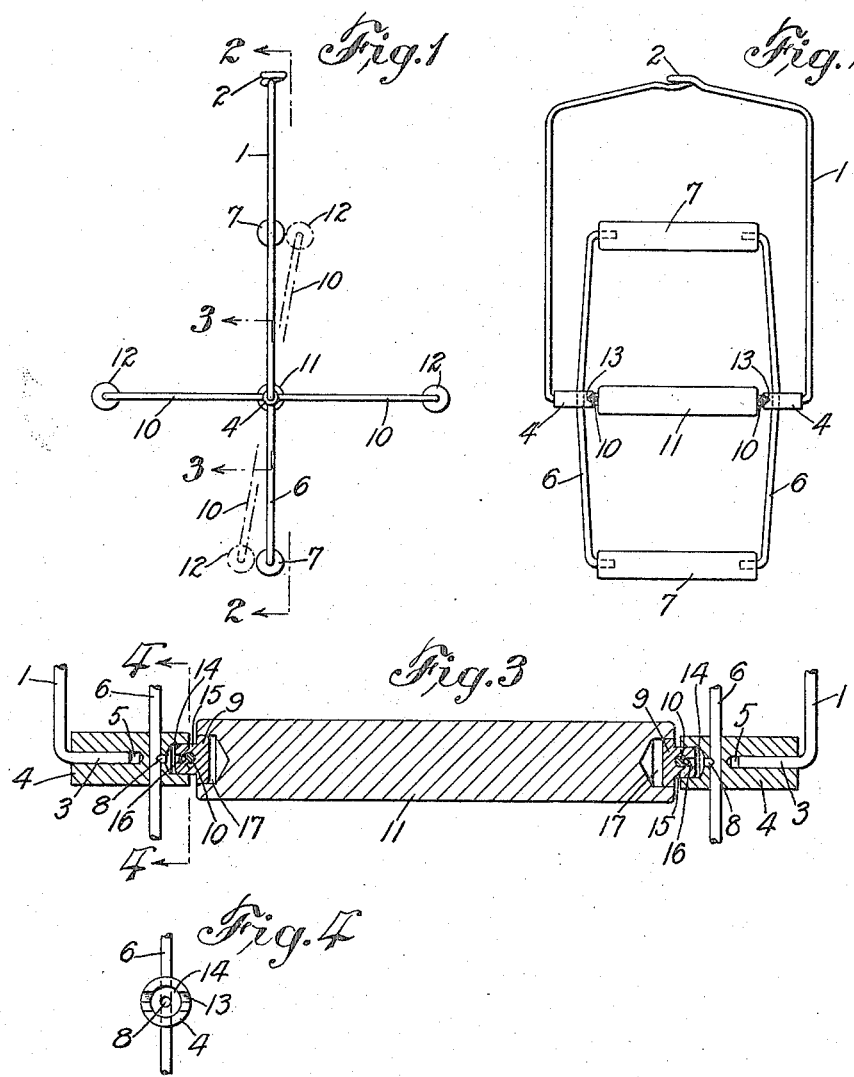

UNITED STATES PATENT OFFICE.

JOHN GEORGE LYDECKER, OF NEW YORK, N. Y.

ROTARY PERCH.

1,180,595.    Specification of Letters Patent.    Patented Apr. 25, 1916.

Application filed August 21, 1915.   Serial No. 46,589.

*To all whom it may concern:*

Be it known that I, JOHN GEORGE LYDECKER, a citizen of the United States, residing at New York city, in the county of New York and State of New York, have invented certain new and useful Improvements in Rotary Perches, of which the following is a specification, reference being had therein to the accompanying drawing.

My present invention refers to certain novel and useful improvements in rotary perches for bird cages and the like, the object of the same being to provide swinging means for the bird which will simulate a bough or twig so that a bird which is confined in a cage may have plenty of opportunity for agile flitting about on a movable device.

The invention consists essentially of a means for suspending a rotary perch in such a way that it will revolve freely and easily when the bird is thereon, and also means for enabling said perch to be folded and taken apart to facilitate removal from and insertion into the cage, and also to promote cleanliness in the device by permitting its parts to be easily disassembled and washed; and also the invention comprises numerous details and peculiarities in the construction, arrangement and combination of the various parts, substantially as will be hereinafter described and then more particularly pointed out in the appended claims.

In the accompanying drawing illustrating my invention: Figure 1 is a side elevation of my improved rotary perch; Fig. 2 is a front view looking in the direction of the arrows at 2, 2 in Fig. 1; Fig. 3 is an enlarged vertical section on the line 3, 3 of Fig. 1; Fig. 4 is a vertical inner view of the notched end of one of the central hubs on the line 4, 4 of Fig. 3.

Similar characters of reference designate corresponding parts throughout the different figures of the drawing.

My improved rotary perch has a general wheel-like form and is adapted to be supported by a wire hanger 1, having a top loop 2, by means of which it can be attached by a wire or otherwise at some suitable point within the cage. The hanger 1 has the parallel side wires, the lower ends of which have the right-angled hub portions 3 which enter the hubs 4 which are bored centrally with passages 5 to loosely receive the bent ends 3.

The hanger 1 has its wire so tensioned that the ends 3 may easily be sprung into the passages 5 in the hubs 4, or removed therefrom at any time at the pleasure of the user in order to disconnect the parts. When the ends 3 are in the hubs 4, the support of the wheel will be a revoluble one, and the said hubs can easily revolve in the hanger as the bird hops about upon the parts of the device.

Securely fastened to the hubs 4 are the parallel wires 6, each hub having preferably one of these wires attached thereto and the wires having their outer ends bent at an angle so as to be driven into or otherwise suitably fastened to the short connecting perch sections or rollers 7, which are preferably of wood. Thus it will be seen that the parallel wires 6, the central hubs 4, and the outer perch sections 7 together form a wheel-like structure which is adapted to be mounted revolubly upon the hanger, as I have already explained. It is not necessary that the wires 6 should be actually parallel, but only substantially so, so that a general rectangular frame may be made thereby; and one simple method of attaching the wires 6 to the hubs 4 consists in passing said wires 6 through transverse holes bored in the hubs 4 for the purpose, and then causing a part of the material of the hub, as at 8, to be driven by a blow from any suitable implement so that it will enter the wire 6 and cause a firm engagement between said wire and the hub, all as clearly indicated at 8. This is easily accomplished, since the inner opposing ends of the hubs 4 are recessed at 14 with a circular recess extending into the interior of the hub a short distance. The maker of the device, by the use of a metallic pin thrust into the bottom of this recess, as at 8, can, with a single blow of a mallet or hammer, drive the material at the bottom of the recess through to the wire 6, so as to make an engagement therewith, as shown in Fig. 3 and as already explained. I do not wish, however, to be restricted to this method of attaching the wires 6 to the hubs, and cite the same simply as one way of easily doing it, for it will be obvious that the wires 6 of the revolving frame may be attached in any desired manner, not only to the hubs, but also to the outer connecting perch parts 7.

In addition to the rectangular frame, which I have just described, I employ a second somewhat similar frame, and if desired, a third, or several, which are supported in unison and are relatively adjustable and foldable in the manner I shall presently specify. This second frame is in general of the same shape and size as the first, and consists of parallel wires 10 fastened at their outer ends to rollers or perch sections 12 and carrying midway of their length small laterally-projecting journals or trunnions 15 adapted to enter loosely the recesses 14 in the hubs 4, said journals 15 being formed with flanges 9 adapted to loosely enter cylindrical recesses 17 in the ends of a central removable perch section 11 which is supported on said flanges 9, and which though revoluble with the frame 10, 10, is relatively stationary, being at the center of the whole structure. The journals 15, although they may be formed in any desired manner on the wires 10, are preferably made as small independent wheels or rollers which are bored transversely to enable the wires 10 to pass through them, a firm attachment between the journals 15 and the wires 10 being effected by driving with some suitable instrument a small hole through the center of the outer face of the journals 15, as at 16, and causing the material of the journals to bite into the wires 10 so as to form a firm engagement in the same way as the connection is made at 8 between the wires 6 and the hubs 4. It will also be noticed that the flanges 9 are preferably made of substantially the same diameter as the inner ends of the hubs 4 with which they come into close contact, so that the device may be neater in appearance, but this construction is not essential and may be varied from. The wires 10, 10 are placed at such a distance apart that they will be parallel to each other when the journals are withdrawn from the recesses 14 in the hubs 4 and substantially parallel when they are inserted in these recesses, though it is desirable that the space between them should be such that they may be pressed toward each other at the moment of inserting the journals in place sufficiently far to allow of enough resiliency to hold the journals in place when so inserted, the wires 10 being therefore of a spring-like character for this purpose. By pressing the wires 10 toward each other, after first removing roller 11, the journals may at any time be withdrawn from the hub, and after being so withdrawn the wires will easily spring back into their normal parallel position until it is desired to again connect the two frames when by gentle pressure drawing the wires toward each other, the journals 15 may be allowed to snap into the recesses where the resiliency of the wires 10 will hold them, or by taking hold of the outer frame and drawing the hubs 4 away from the journals 15, by bending the wires 6 slightly, a similar result will be accomplished in separating the frames. The inner ends of the hubs 4 are provided with transverse notches 13. When the inner frame is so placed that its wires 10 lie at right angles to the wires 6 of the other frame, said wires 10 will drop into the notches 13, thereby locking the two frames at right angles to each other and permitting the journal flanges 9 to close up against the ends of the hubs 4, so that the hub and journal will appear as substantially one piece.

The folding of the frames together is brought about very easily at any time by simply drawing a roller 7 and a roller 12 toward each other, as shown in Fig. 1, which will cause the wires 10 to ride up out of the notches 13 and lie on the edges of the recesses 14, it being possible to restore the former position by an easy movement which will bring the wires 10 again into the notches 13. It will thus be seen that by the use of the two frames, or more if desired, easily attached to each other and carried by a pair of hubs that are supported revolubly on a hanger, a revolving perch is furnished having perch members at the ends of the frames on which the bird may jump about and around which it can swing as naturally as upon the swaying branches of a tree or bush. The bird takes great pleasure in hopping about upon a revolving wheel of this character, and it not only assists in the exercising of the bird, but contributes to its enjoyment and health.

An important feature of the invention is the ease with which the parts may be separated from each other for washing and cleaning, thus enabling the perch to be perfectly sanitary which is a great advantage. When the inner frame is withdrawn from the other by detaching its journals from the hubs, and the outer frame has its hubs removed from the hanger, the three main parts of the device can be easily washed or arranged for transportation, and also it will be observed that the interpivoted frames are capable of very easily folding and unfolding which enables them to be introduced into the interior of the cage and placed in position and also removed therefrom with very little difficulty.

Many changes in the precise construction, arrangement and location of the various parts may be made without exceeding the scope of my invention.

Having thus described my invention, what I claim as new and desire to secure by Letters Patent, is:

1. In a rotary perch, the combination of a pair of hubs having locking means thereon, means for supporting said hubs revolubly, wires secured to the hubs, perch members attached to the wires, a pair of journals supported in the hubs, wires carrying said journals and adapted to be locked in place by the locking means on the hubs, and perch members attached to said wires.

2. In a rotary perch, the combination of a revolving frame consisting of hubs, wires secured thereto, and connections between the ends of the wires, and a second frame adjustable relatively to the first and consisting of a pair of wires, journals carried thereby and connections between the ends of the wires, said journals being supported in recesses in the hub.

3. In a rotary perch, the combination of a revolving frame including hubs having notches in their inner ends, wires secured thereto, and connections between the ends of the wires, and a second frame adjustable relatively to the first and consisting of parallel wires, journals carried thereby and connections between the ends of the wires, said journals being supported in recesses in the hub, and said second frame being adapted to fold within the other frame and to be held at times at an angle thereto by the engagement of its wires with the notches in the inner ends of the hubs.

4. In a rotary perch, the combination of a revolving frame, consisting of a pair of wires, perch connections between their outer ends, hubs carried by the wires and having recesses in their ends, and also locking notches, another similar frame supported in the first and consisting of a pair of wires, perch connections between their outer ends, journals or trunnions carried by the wires and entering the inner ends of the hubs, said wires being adapted to engage the locking notches, and a central connection supported by said journals.

5. The combination with a hanger, of a revolving frame for a perch, consisting of a pair of wires, connections between the ends thereof, horizontal hubs having locking means thereon supported by the wires and revolubly supported by the hanger, and another frame arranged in connection with the first-mentioned frame and similarly constructed with a pair of wires and perch connections between the ends, journals or trunnions on the wires of the second frame arranged to enter the recesses in the hubs and be held therein by the tension of the wires, said wires engaging the locking means on said hubs.

In testimony whereof I affix my signature.

JOHN GEORGE LYDECKER.

Copies of this patent may be obtained for five cents each, by addressing the "Commissioner of Patents, Washington, D. C."